United States Patent
Huang

(10) Patent No.: US 11,403,010 B2
(45) Date of Patent: Aug. 2, 2022

(54) DATA STORAGE DEVICE AND PLANE SELECTION METHOD THEREOF

(71) Applicant: Silicon Motion, Inc., Jhubei (TW)

(72) Inventor: Sheng-Yuan Huang, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

(21) Appl. No.: 16/996,906

(22) Filed: Aug. 19, 2020

(65) Prior Publication Data
US 2022/0057946 A1    Feb. 24, 2022

(51) Int. Cl.
G06F 3/06    (2006.01)

(52) U.S. Cl.
CPC .......... G06F 3/0631 (2013.01); G06F 3/0619 (2013.01); G06F 3/0659 (2013.01); G06F 3/0673 (2013.01); *G06F 2212/7211* (2013.01)

(58) Field of Classification Search
CPC .... G06F 3/0631; G06F 3/0673; G06F 3/0659; G06F 3/0619; G06F 2212/7211
See application file for complete search history.

(56) References Cited

U.S. PATENT DOCUMENTS

| | | | |
|---|---|---|---|
| 5,502,728 A | 3/1996 | Smith, III | |
| 2004/0153961 A1 | 8/2004 | Park et al. | |
| 2016/0239382 A1* | 8/2016 | Lin | G06F 11/1048 |
| 2017/0323688 A1* | 11/2017 | Huang | G11C 29/44 |
| 2018/0046372 A1* | 2/2018 | Cai | G11C 16/0483 |
| 2021/0158861 A1* | 5/2021 | Jeong | G06F 11/1048 |
| 2021/0174892 A1* | 6/2021 | Nadeau-Dostie | G11C 11/1675 |
| 2021/0365316 A1* | 11/2021 | Nale | G11C 29/4401 |

FOREIGN PATENT DOCUMENTS

| | | |
|---|---|---|
| TW | I553650 B | 10/2016 |
| TW | 201810028 A | 3/2018 |

* cited by examiner

*Primary Examiner* — Sean D Rossiter

(57) ABSTRACT

A plane selection method is provided, which is applied to a data storage medium including a plurality of planes, wherein each of the planes includes a plurality of blocks, each of the blocks includes a plurality of pages, and each of the pages which includes a plurality of data columns is divided into a plurality of chunks. The plane selection method includes steps of defining at least one data column having a largest number of error bits in a worst chunk as a bad column until a quantity of bad columns is used up, determining whether at least two planes are uncorrectable according to a distribution of the bad columns, and eliminating a record of the bad columns and banning a worse plane which had the most bad columns than other planes.

16 Claims, 6 Drawing Sheets

DATA STORAGE DEVICE AND PLANE SELECTION METHOD THEREOF

FIELD OF THE INVENTION

The present invention relates to a technique for data storage, and more particularly to a data storage device and a plane selection method thereof.

BACKGROUND OF THE INVENTION

A data storage device, such as a solid state drive (SSD), a secure digital (SD) memory card or a portable flash memory, mainly is constituted by a control unit and a data storage medium. The data storage medium is constituted by a plurality of dies which are enabled by Chip Enable (CE) of the control unit. Each die has a plurality of planes, and the planes have a plurality of data columns for storing data.

Inevitably, secondary products may be produced in the manufacturing process of data storage devices. Therefore, it is necessary to screen all the bad columns in the data storage medium and record the bad columns in a bad column summary table before shipping the secondary products to market. According to the bad column summary table, the control unit is prevented from accessing these bad columns so as to avoid data access error during operation.

In general, the data storage device uses an error correcting code (ECC) to correct its stored data. However, a number of the bad columns which is provided by a hardware is limited duo to a size of memory. When the limited number of the bad columns is evenly distributed to each of plurality of planes, some planes having more bad columns may not be corrected by ECC.

SUMMARY OF THE INVENTION

One objective of the present invention is to provide a plane selection method for a data storage device. The plane selection method can effectively use a limited number of the bad columns, and thereby optimizing a distribution of the bad columns onto planes.

The present invention provides a plane selection method which is applied to a data storage medium. The data storage medium includes a plurality of planes, each of the planes includes a plurality of blocks, each of the blocks includes a plurality of pages, and each of the pages which includes a plurality of data columns is divided into a plurality of chunks. The plane selection method includes steps of: defining at least one data column having a largest number of error bits in a worst chunk as a bad column until a quantity of bad columns is used up; determining whether at least two planes are uncorrectable according to a distribution of the bad columns; and eliminating a record of the bad columns and banning a worse plane which had the most bad columns than other planes.

The present invention further provides a plane selection method which is applied to a data storage medium. The data storage medium includes a plurality of planes, each of the planes includes a plurality of blocks, each of the blocks includes a plurality of pages, and each of the pages which includes a plurality of data columns is divided into a plurality of chunks. The plane selection method includes steps of: defining at least one data column having a largest number of error bits in a worst chunk as a bad column until a quantity of bad columns is used up; determining whether at least one plane is uncorrectable according to a distribution of the bad columns; and eliminating a record of the bad columns and banning a worst plane which had the most bad columns than other planes.

The present invention further provides a data storage device, which includes a controller and a data storage medium. The data storage medium includes a plurality of planes, each of the planes includes a plurality of blocks, each of the blocks includes a plurality of pages, and each of the pages which includes a plurality of data columns is divided into a plurality of chunks. A plane selection method is executed by the control unit including: defining at least one data column having a largest number of error bits in a worst chunk as a bad column until a quantity of bad columns is used up; determining whether at least two planes are uncorrectable according to a distribution of the bad columns; and eliminating a record of the bad columns and banning a worst plane which had the most bad columns than other planes.

The present invention further provides a data storage device with a plane summary table, which includes a controller and a data storage medium. The data storage medium includes a plurality of planes, each of the planes includes a plurality of blocks, each of the blocks includes a plurality of pages, and each of the pages which includes a plurality of data columns is divided into a plurality of chunks. A plane selection method is executed by the control unit including: defining at least one data column having a largest number of error bits in a worst chunk as a bad column until a quantity of bad columns is used up; determining whether at least one plane is uncorrectable according to a distribution of the bad columns; and eliminating a record of the bad columns and banning a worst plane which had the most bad columns than other planes.

In summary, the plane selection method for the data storage device provided by the present invention can leave a bad plane, ban other planes which are uncorrectable and use all the bad columns onto the bad plane, or ban all the planes which are uncorrectable and distribute the limited number of the bad columns onto other planes, so that the number of the bad columns can be effectively used and the distribution of the bad columns can be optimized.

BRIEF DESCRIPTION OF THE DRAWINGS

Other advantages, objectives and features of the present invention will become apparent from the following description referring to the attached drawings.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
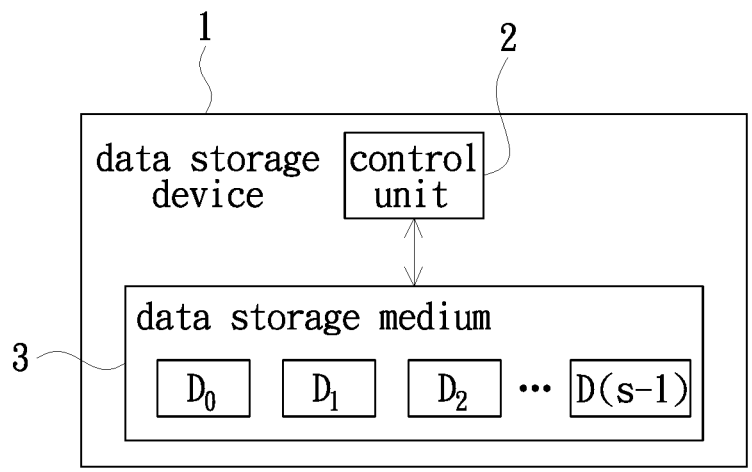
FIG. 1 depicts a data storage device in accordance with an embodiment of the present invention.
Figure 2:
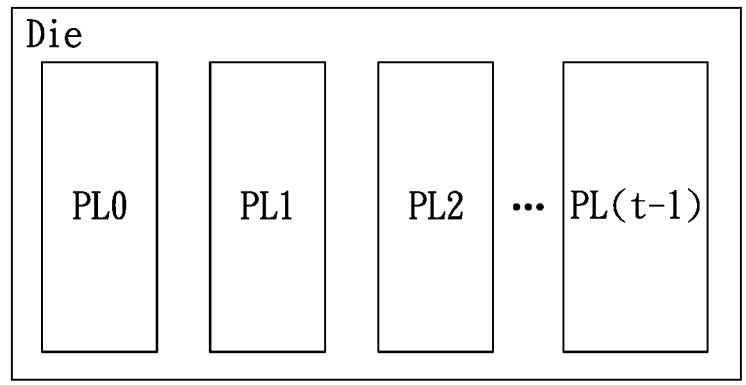
FIG. 2 depicts a die in accordance with an embodiment of the present invention.
Figure 3:
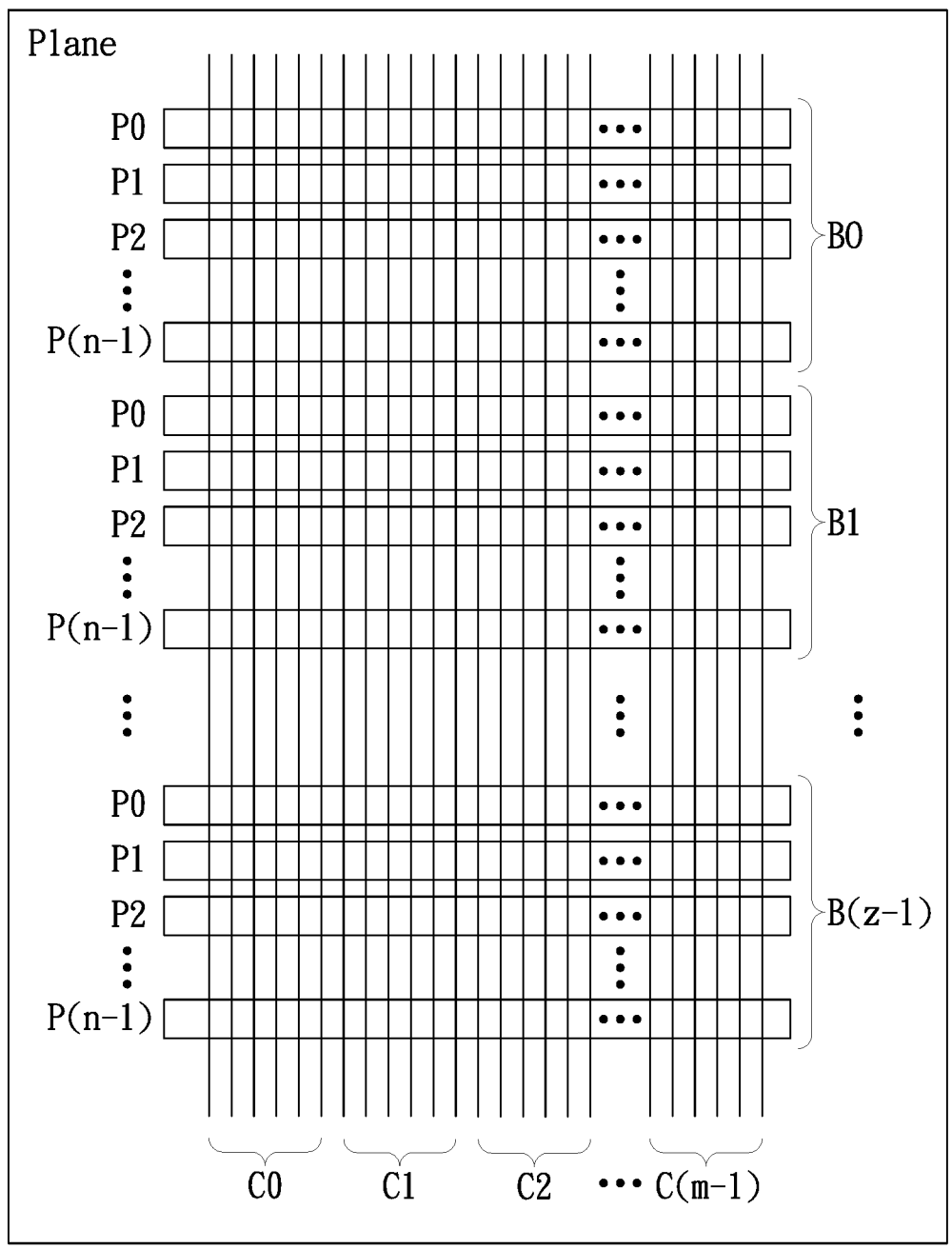
FIG. 3 depicts a plane in accordance with an embodiment of the present invention.

FIGS. 1, 2, and 3 respectively depict a data storage device, a die, and a plane in accordance with embodiments of the present invention. The data storage device 1 of the present invention includes a control unit 2 and a data storage medium 3, wherein the data storage medium 3 may be a non-volatile memory such as a flash memory, MRAM (Magnetic RAM), FRAM (Ferroelectric RAM), PCM (Phase Change Memory), STTRAM (Spin-Transfer Torque RAM), ReRAM (Resistive RAM) or Memristor capable of storing data for a long time. The data storage medium 3 may include a plurality of dies D0, D1, D2, . . . , D(s−1). The control unit 2 uses chip enable (CE) pins to enable at least one of the dies D0, D1, D2, . . . , D(s−1) which will be accessed. Each of the dies D0, D1, D2, . . . , D(s−1) includes a plurality of planes PL0, PL1, PL2, . . . , PL(t−1). Each of the planes PL0, PL1, PL2, . . . , PL(t−1) includes a plurality of blocks B0, B1, B2, . . . , B(z−1). Each of the blocks B0, B1, B2, . . . , B(z−1) includes a plurality of pages P0, P1, P2, . . . , P(n−1). Each of the pages P0, P1, P2, . . . , P(n−1) which includes a plurality of data columns is divided to a plurality of chunks C0, C1, C2, . . . , C(m−1).

Figure 4:
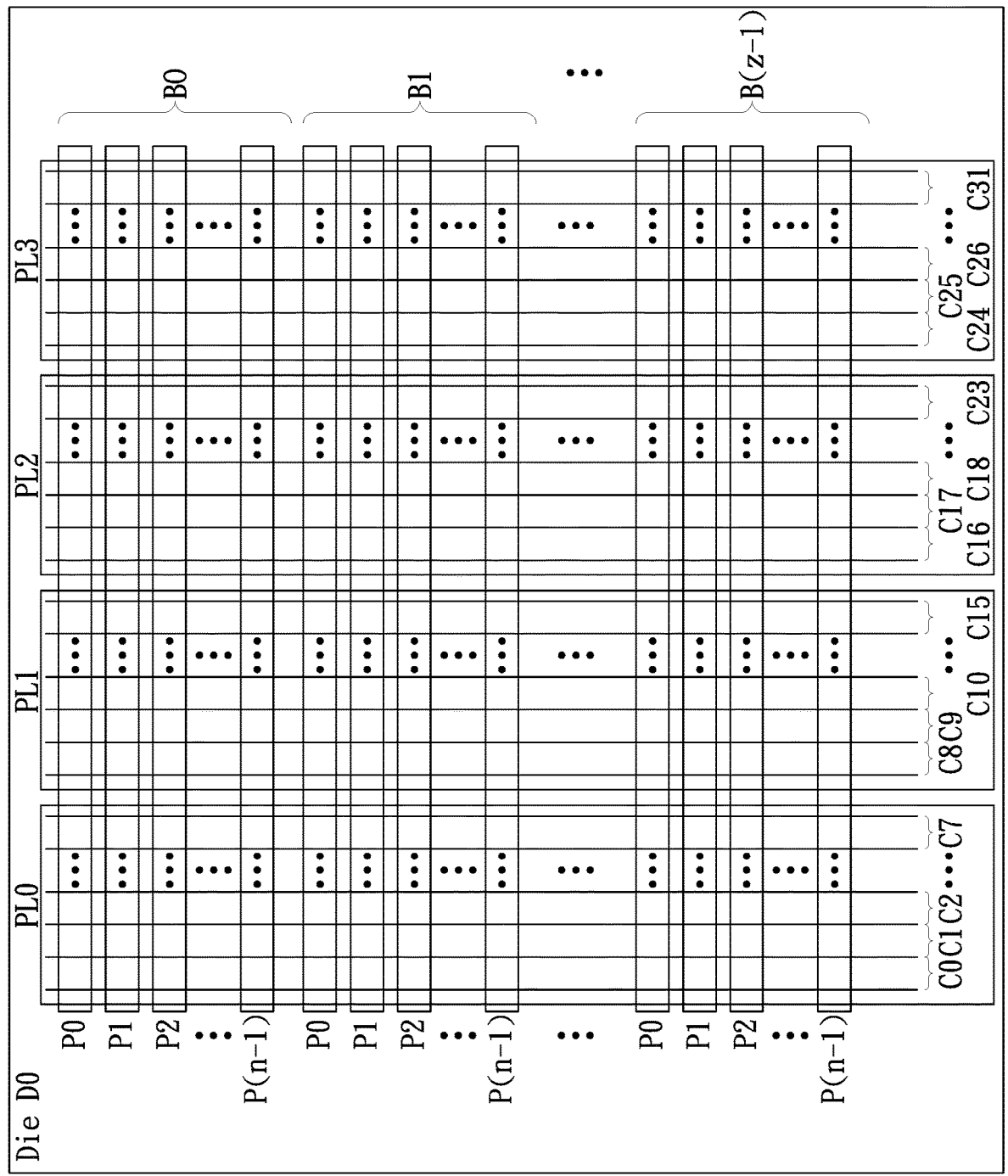
FIG. 4 depicts a die in accordance with another embodiment of the present invention.

A plane selection method disclosed in the present invention will be described as follow. FIG. 4 depicts a die in accordance with another embodiment of the present invention. In order to effectively selecting planes, preferably, a die D0 in the data storage medium 3 is selected as a sample die for executing the plane selection method of the present invention, and the present invention is not limited thereto. In the embodiment, the die D0 includes four planes PL0, PL1, PL2, PL3. Each of the planes PL0, PL1, PL2, PL3 includes a plurality of blocks B0, B1, B2, . . . , B(z−1). Each of the blocks B0, B1, B2, . . . , B(z−1) includes a plurality of pages P0, P1, P2, . . . , P(n−1). Each of the pages P0, P1, P2, . . . , P(n−1) which includes a plurality of data columns is divided to eight chunks, wherein the pages P0, P1, P2, . . . , P(n−1) in the plane PL0 are divided to eight chunks C0-C7, the pages P0, P1, P2, . . . , P(n−1) in the plane PL1 are divided to eight chunks C8-C15, the pages P0, P1, P2, . . . , P(n−1) in the plane PL2 are divided to eight chunks C16-C23, and the pages P0, P1, P2, . . . , P(n−1) in the plane PL3 are divided to eight chunks C24-C31.

Figure 5:
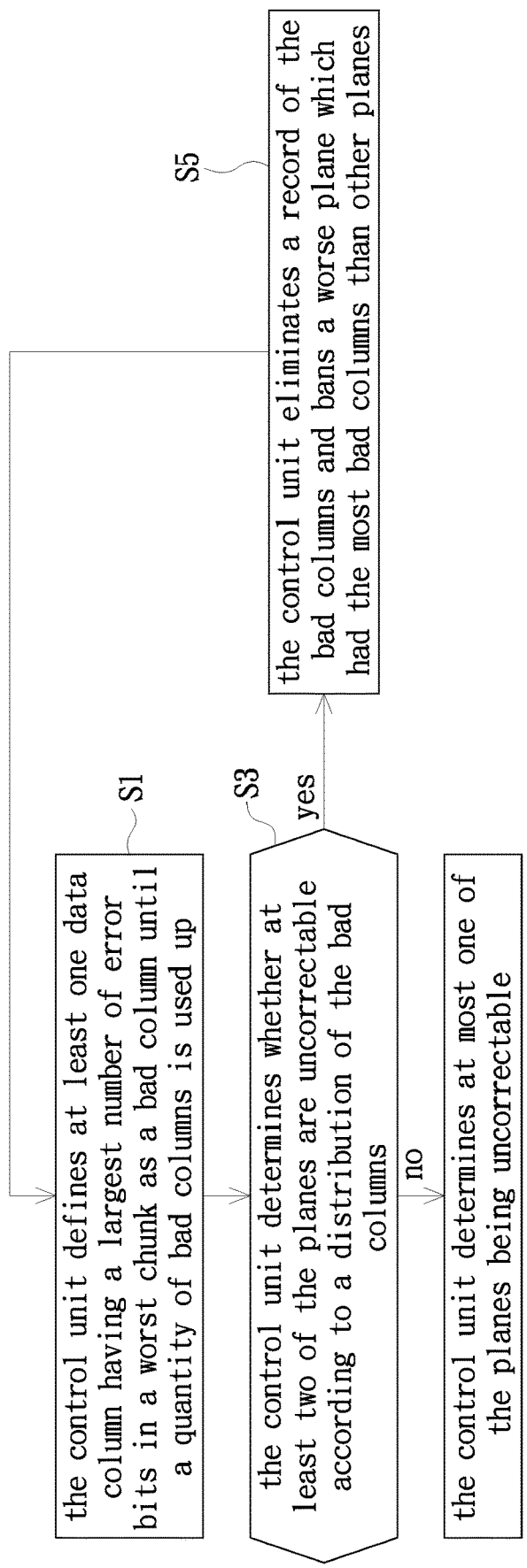
FIG. 5 is a flowchart of a plane selection method in accordance with an embodiment of the present invention.

FIG. 5 is a flowchart of a plane selection method in accordance with an embodiment of the present invention. As shown in FIG. 5, the plane selection method of the present invention includes Step S1: the control unit 2 defining at least one data column having a largest number of error bits in a worst chunk as a bad column until a quantity of bad columns is used up.

Figure 6:
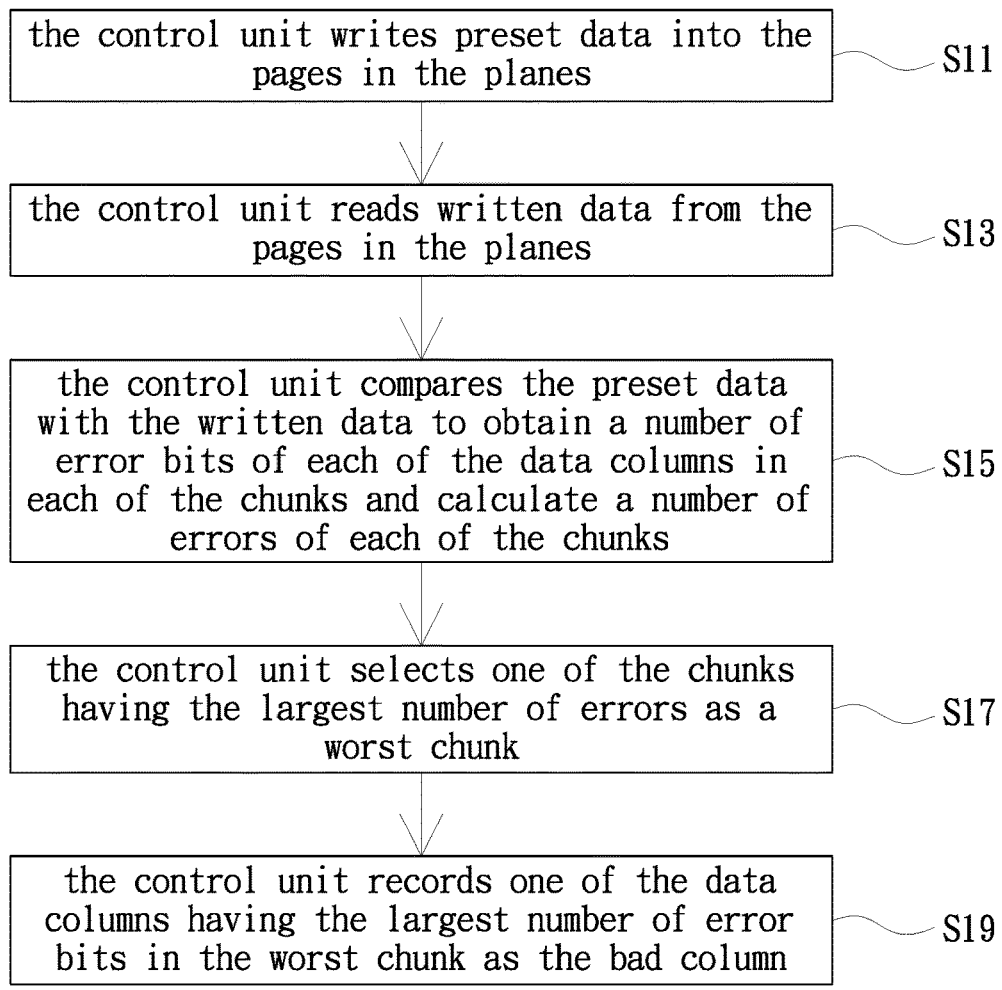
FIG. 6 is a flowchart of defining bad columns in accordance with an embodiment of the present invention.

In the Step S1, the control unit 2 defines a number of bad columns as shown in FIG. 6 which is a flowchart of defining bad columns in accordance with an embodiment of the present invention. In Step S11: the control unit 2 writes preset data into the pages P0, P1, P2, . . . , P(n−1) in the planes PL0, PL1, PL2, PL3. The preset data may be specific or random data. In Step S13: the control unit 2 reads written data from the pages P0, P1, P2, . . . , P(n−1) in the planes PL0, PL1, PL2, PL3. In Step S15: the control unit 2 compares the preset data with the written data to obtain a number of error bits of each of the data columns in each of the chunks C0, C1, C2, . . . , C31 and calculate a number of errors of each of the chunks C0, C1, C2, . . . , C31. When a bit in the written data is not equal to a respective bit in the preset data, this bit is determined as an error bit, and the number of errors of each of the chunks C0, C1, C2, . . . , C31 is obtained by summing the numbers of error bits occurring at each of the data columns in each of the chunks C0, C1, C2, . . . , C31. In Step S17: the control unit 2 selects one of the chunks C0, C1, C2, . . . , C31 having the largest number of errors as the worst chunk, wherein the number of errors is a total number of error bits or an average value of error bits in each of the chunks C0, C1, C2, . . . , C31. In Step S19: the control unit 2 records one of the data columns having the largest number of error bits in the worst chunk as the bad column. Then, the control unit 2 repeatedly counts the bad columns into a bad column summary table until the quantity of bad columns is used up (e.g., the bad column summary table may record up to 512 pieces of bad column data). Finally, the control unit 2 calculates a total number of error bits of the data columns in each of the chunks C0, C1, C2, . . . , C31, average error rates of each of the data columns in each of the chunks C0, C1, C2, . . . , C31, locations of the bad columns in each of the chunks C0, C1, C2, . . . , C31, and a size of each of the chunks C0, C1, C2, . . . , C31, wherein calculations of an average error rate of a data column and a size of a chunk are techniques well known to those skilled in the art, so these will not be described herein.

As shown in FIG. 5, the plane selection method of the present invention includes Step S3: the control unit 2 determining whether at least two of the planes PL0, PL1, PL2, PL3 are uncorrectable according to a distribution of the bad columns.

In the Step S3, the control unit 2 firstly determines whether each of the chunks C0, C1, C2, . . . , C31 can be corrected by ECC according to the average error rates of each of the data columns in a chunk, the locations of the bad columns in the chunk, and a size of the chunk. When the chunks in a plane have a number of errors exceeding a correction ability of the ECC, it means that the plane is uncorrectable. Then, the control unit 2 determines whether at least two of the planes PL0, PL1, PL2, PL3 are uncorrectable. In addition, the distribution of the bad columns includes a number of, the locations of, and the error rates of the bad columns in each of the planes PL0, PL1, PL2, PL3.

As shown in FIG. 5, the plane selection method of the present invention includes Step S5: the control unit 2 eliminating a record of the bad columns and banning a worse plane which had the most bad columns than other planes when determining the at least two of the planes PL0, PL1, PL2, PL3 being uncorrectable.

Figure 7:
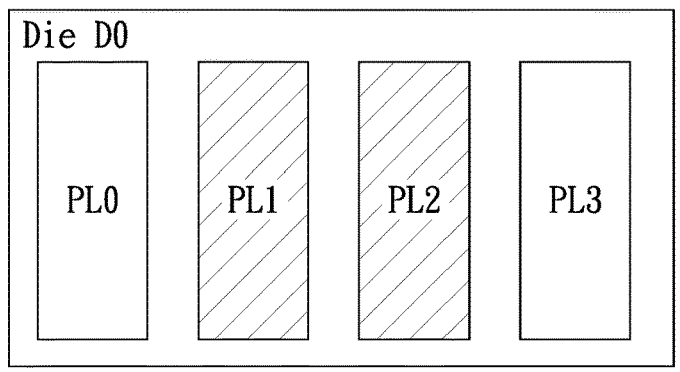
FIG. 7 is an exemplary diagram for banning a bad plane.

In the step S5, when several planes are uncorrectable, the control unit 2 counts a total number of the bad columns in each of the uncorrectable planes. For example, suppose that the planes PL0, PL3 are correctable, the planes PL1, PL2 are uncorrectable, and a number of the bad columns in the plane PL1 is larger than that in the plane PL2 after the Step S1. The control unit 2 firstly determines whether at least two of the planes PL0, PL1, PL2, PL3 are uncorrectable. When the control unit 2 determines the planes PL1, PL2 being uncorrectable and determines that the uncorrectable plane PL1 which is a worse plane should be banned preferentially according to the number of the bad columns, the control unit 2 eliminates the record of the bad columns in the bad column summary table and bans the uncorrectable plane PL1 as shown in FIG. 7 which is an exemplary diagram for banning a bad plane.

As shown in FIG. 5, the plane selection method of the present invention can be performed repeatedly until the control unit 2 determines at most one of the planes PL0, PL1, PL2, PL3 being uncorrectable. For example, after the control unit 2 eliminates the record of the bad columns in the bad column summary table and bans the uncorrectable plane PL1, the control unit 2 again defining at least one data column having a largest number of error bits in a worst chunk as a bad column in the planes PL0, PL2, PL3 until the quantity of bad columns is used up. Then, the control unit 2 determines whether at least two of the planes PL0, PL2, PL3 are uncorrectable. When the control unit 2 determines only that the plane PL2 is uncorrectable, the control unit 2 records the bad columns of the plane PL2 into the bad column summary table until the quantity of bad columns is used up, and tries to correct the plane PL2 by the ECC, such that the plane PL2 has an opportunity to be used. Since the planes PL0, PL3 are correctable and the plane PL2 may be available to be used, the plane selection method of the present invention can effectively use the limited number of the bad columns, and optimize a distribution of the bad columns onto planes.

In another example, suppose that the planes PL0, PL1, PL2, PL3 are correctable after the Step S1. The control unit 2 firstly determines whether at least two of the planes PL0, PL1, PL2, PL3 are uncorrectable. When the control unit 2 determines that the planes PL0, PL1, PL2, PL3 are correctable, the control unit 2 records the bad columns of the planes PL0, PL1, PL2, PL3 into the bad column summary table, so that the control unit 2 can be prevented to access these bad columns according to the bad column summary table. As a result, all the data columns can be used for storing data except the bad columns, and consequentially the data storage medium 3 of the data storage device 1 of the present invention has the optimizing data storage capacity.

Figure 8:
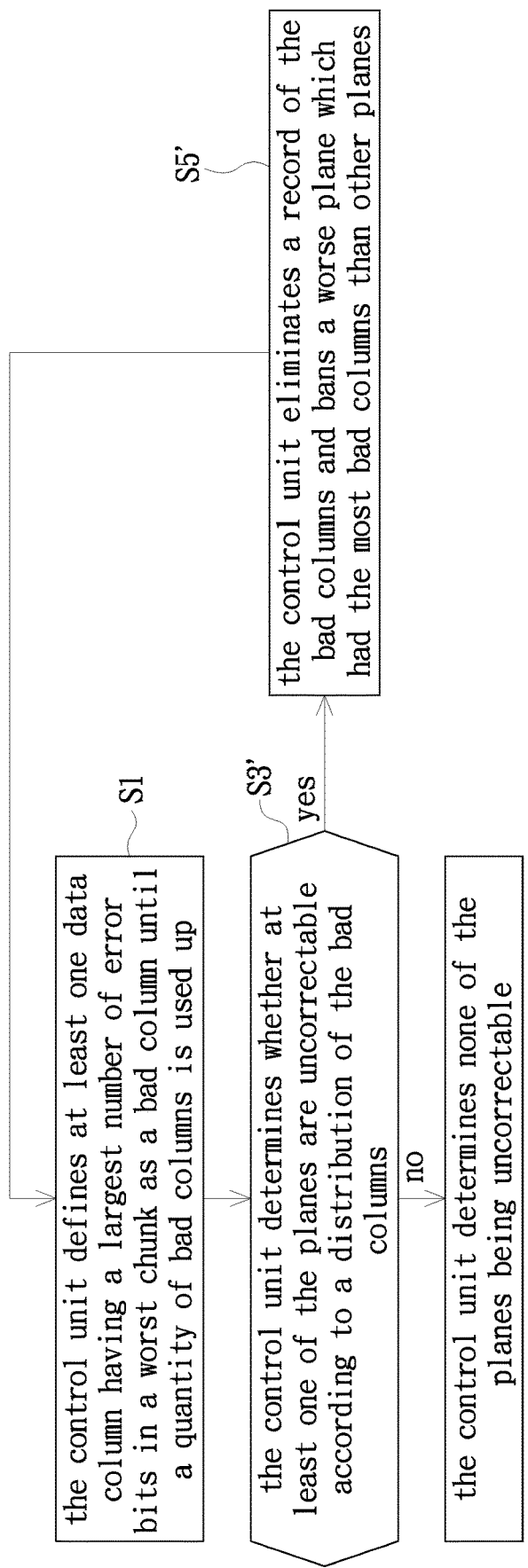
FIG. 8 is a flowchart of a plane selection method in accordance with another embodiment of the present invention.

FIG. 8 is a flowchart of a plane selection method in accordance with another embodiment of the present invention. In the embodiment, the plane selection method of the present invention includes Step S1: the control unit 2 defining at least one data column having a largest number of error bits in a worst chunk as a bad column until a quantity of bad columns is used up, Step S3': the control unit 2 determining whether at least one of the planes is uncorrectable according to a distribution of the bad columns, and Step S5': the control unit 2 eliminating a record of the bad columns and banning a worse plane which had the most bad columns than other planes. It is to be noted that differences between this plane selection method and the previous one are that the control unit 2 in this plane selection method determines whether at least one of the planes is uncorrectable in the Step S3', the control unit 2 bans the at least one of the planes being uncorrectable when determining the at least one of the planes being uncorrectable in the Step S5', and the plane selection method of the present invention can performed repeatedly until the control unit 2 determines none of the planes being uncorrectable.

For example, suppose that the planes PL0, PL3 are correctable, the planes PL1, PL2 are uncorrectable, and a number of the bad columns in the plane PL1 is larger than that in the plane PL2 after the Step S1. The control unit 2 firstly determines whether at least one of the planes PL0, PL1, PL2, PL3 are uncorrectable. When the control unit 2 determines the planes PL1, PL2 being uncorrectable and determines that the uncorrectable plane PL1 which is the worst plane should be banned preferentially according to the number of the bad columns, the control unit 2 eliminates the record of the bad columns in the bad column summary table and bans the uncorrectable plane PL1. After the control unit 2 eliminates the record of the bad columns in the bad column summary table and bans the uncorrectable plane PL1, the control unit 2 again defines at least one data column having a largest number of error bits in a worst chunk as a bad column in the planes PL0, PL2, PL3 until the quantity of bad columns is used up. The control unit 2 determines whether at least one of the planes PL0, PL2, PL3 is uncorrectable. When the control unit 2 determines that the plane PL2 is uncorrectable, the control unit 2 eliminates the record of the bad columns in the bad column summary table and bans the uncorrectable plane PL2. After the control unit 2 eliminates the record of the bad columns in the bad column summary table and bans the uncorrectable plane PL2, the control unit 2 again defines at least one data column having a largest number of error bits in a worst chunk as a bad column in the planes PL0, PL3 until the quantity of bad columns is used up. Then, the control unit 2 determines whether at least one of the planes PL0, PL3 is uncorrectable. When the control unit 2 determines that the planes PL0, PL3 are correctable, the control unit 2 records the bad columns of the planes PL0, PL3 into the bad column summary table, so that the control unit 2 can be prevented to access these bad columns according to the bad column summary table. As a result, all the data columns can be used for storing data except the bad columns, and consequentially the data storage medium 3 of the data storage device 1 of the present invention has the optimizing data storage capacity.

In summary, the plane selection method of the present invention not only defines at least one data column having a largest number of error bits in a worst chunk as a bad column, and records the bad column in the bad column summary table, but also determines whether planes are uncorrectable, bans bad planes to be used. Therefore, the control unit of the data storage device of the present invention can be prevented to access the bad columns and the bad planes. As a result, the plane selection method for the data storage device of the present invention can effectively use the limited number of the bad columns, and thereby optimizing a distribution of the bad columns onto planes.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A plane selection method, applied to a data storage medium including a plurality of planes, wherein each of the planes includes a plurality of blocks, each of the blocks includes a plurality of pages, and each of the pages which includes a plurality of data columns is divided into a plurality of chunks, the plane selection method comprising:
defining at least one data column having a largest number of error bits in a worst chunk as a bad column until a quantity of bad columns in a bad column summary table is used up;
determining whether at least two planes are uncorrectable according to a distribution of the bad columns; and
eliminating a record of the bad columns in the bad column summary table and banning a worse plane which was uncorrectable and had the most bad columns than other planes when determining the at least two planes being uncorrectable.

2. The plane selection method according to claim 1, wherein the plane selection method is repeated until determining at most one plane being uncorrectable.

3. The plane selection method according to claim 1, wherein a step of defining at least one data column having a largest number of error bits in a worst chunk as a bad column until a quantity of bad columns in a bad column summary table is used up includes:
  writing preset data into the pages;
  reading written data from the pages;
  comparing the preset data with the written data to obtain a number of error bits of each of the data columns in each of the chunks and calculate a number of errors in each of the chunks;
  selecting one of the chunks having a largest number of errors as the worst chunk; and
  recording one of the data columns having the largest number of error bits in the worst chunk as the bad column.

4. The plane selection method according to claim 3, wherein the number of errors is a total number of error bits or an average value of error bits.

5. A plane selection method, applied to a data storage medium including a plurality of planes, wherein each of the planes includes a plurality of blocks, each of the blocks includes a plurality of pages, and each of the pages which includes a plurality of data columns is divided into a plurality of chunks, the plane selection method comprising:
  defining at least one data column having a largest number of error bits in a worst chunk as a bad column until a quantity of bad columns in a bad column summary table is used up;
  determining whether at least one plane is uncorrectable according to a distribution of the bad columns; and
  eliminating a record of the bad columns in the bad column summary table and banning a worst plane which was uncorrectable and had the most bad columns than other planes when determining the at least one plane being uncorrectable.

6. The plane selection method according to claim 5, wherein the plane selection method is repeated until determining none of the planes being uncorrectable.

7. The plane selection method according to claim 5, wherein a step of defining at least one data column having a largest number of error bits in a worst chunk as a bad column until a quantity of bad columns in a bad column summary table is used up includes:
  writing preset data into the pages;
  reading written data from the pages;
  comparing the preset data with the written data to obtain a number of error bits of each of the data columns in each of the chunks and calculate a number of errors in each of the chunks;
  selecting one of the chunks having a largest number of errors as the worst chunk; and
  recording one of the data columns having the largest number of error bits in the worst chunk as the bad column.

8. The plane selection method according to claim 7, wherein the number of errors is a total number of error bits or an average value of error bits.

9. A data storage device, comprising a controller and a data storage medium, wherein the data storage medium includes a plurality of planes, each of the planes includes a plurality of blocks, each of the blocks includes a plurality of pages, and each of the pages which includes a plurality of data columns is divided into a plurality of chunks, a plane selection method is executed by the control unit and including:
  defining at least one data column having a largest number of error bits in a worst chunk as a bad column until a quantity of bad columns in a bad column summary table is used up;
  determining whether at least two planes are uncorrectable according to a distribution of the bad columns; and
  eliminating a record of the bad columns in the bad column summary table and banning a worst plane which was uncorrectable and had the most bad columns than other planes when determining the at least two planes being uncorrectable.

10. The data storage device according to claim 9, wherein the plane selection method is repeated until determining at most one plane being uncorrectable.

11. The data storage device according to claim 9, wherein a step of defining at least one data column having a largest number of error bits in a worst chunk as a bad column until a quantity of bad columns in a bad column summary table is used up includes:
  writing preset data into the pages;
  reading written data from the pages;
  comparing the preset data with the written data to obtain a number of error bits of each of the data columns in each of the chunks and calculate a number of errors in each of the chunks;
  selecting one of the chunks having a largest number of errors as the worst chunk; and
  recording one of the data columns having the largest number of error bits in the worst chunk as the bad column.

12. The data storage device according to claim 11, wherein the number of errors is a total number of error bits or an average value of error bits.

13. A data storage device with a plane summary table, comprising a controller and a data storage medium, wherein the data storage medium includes a plurality of planes, each of the planes includes a plurality of blocks, each of the blocks includes a plurality of pages, and each of the pages which includes a plurality of data columns is divided into a plurality of chunks, a plane selection method is executed by the control unit and including:
  defining at least one data column having a largest number of error bits in a worst chunk as a bad column until a quantity of bad columns in a bad column summary table is used up;
  determining whether at least one plane is uncorrectable according to a distribution of the bad columns; and
  eliminating a record of the bad columns in the bad column summary table and banning a worst plane which was uncorrectable and had the most bad columns than other planes when determining the at least one plane being uncorrectable.

14. The data storage device according to claim 13, wherein the plane selection method is repeated until determining none of the planes being uncorrectable.

15. The data storage device according to claim 13, wherein a step of defining at least one data column having a largest number of error bits in a worst chunk as a bad column until a quantity of bad columns in a bad column summary table is used up includes:
  writing preset data into the pages;
  reading written data from the pages;
  comparing the preset data with the written data to obtain a number of error bits of each of the data columns in each of the chunks and calculate a number of errors in each of the chunks;

selecting one of the chunks having a largest number of errors as the worst chunk; and recording one of the data columns having the largest number of error bits in the worst chunk as the bad column.

16. The data storage device according to claim 15, wherein the number of errors is a total number of error bits or an average value of error bits.

\* \* \* \* \*